(12) United States Patent
Nakao

(10) Patent No.: US 10,394,424 B2
(45) Date of Patent: Aug. 27, 2019

(54) INFORMATION DISPLAY, INFORMATION DISPLAY METHOD, INFORMATION DISPLAY SYSTEM, PROGRAM, AND RECORDING MEDIUM

(71) Applicant: NEC Solution Innovators, Ltd., Koto-ku, Tokyo (JP)

(72) Inventor: Yusuke Nakao, Tokyo (JP)

(73) Assignee: NEC SOLUTION INNOVATORS, LTD., Tokyo (JP)

( * ) Notice: Subject to any disclaimer, the term of this patent is extended or adjusted under 35 U.S.C. 154(b) by 2 days.

(21) Appl. No.: 15/562,055

(22) PCT Filed: Nov. 27, 2015

(86) PCT No.: PCT/JP2015/083395
§ 371 (c)(1),
(2) Date: Sep. 27, 2017

(87) PCT Pub. No.: WO2016/157617
PCT Pub. Date: Oct. 6, 2016

(65) Prior Publication Data
US 2018/0107348 A1    Apr. 19, 2018

(30) Foreign Application Priority Data

Mar. 31, 2015 (JP) ................................. 2015-071821

(51) Int. Cl.
*G06F 3/0482* (2013.01)
*G06Q 10/10* (2012.01)
(Continued)

(52) U.S. Cl.
CPC .......... *G06F 3/0482* (2013.01); *G06F 3/0483* (2013.01); *G06F 16/2423* (2019.01);
(Continued)

(58) Field of Classification Search
CPC ..................................................... G06F 17/245
(Continued)

(56) References Cited

U.S. PATENT DOCUMENTS 6,271,846 B1 * 8/2001 Martinez ............... G06F 3/0482
715/854
7,761,591 B2 * 7/2010 Graham ................. G06Q 40/02
709/204
(Continued)

FOREIGN PATENT DOCUMENTS

JP        2007-507797 A        3/2007
JP        2007-280125 A       10/2007

OTHER PUBLICATIONS

Jenifer Tidwell, "Designing Interfaces: Patterns for Effective Interaction Design", (translation-supervised by Sociomedia, Inc., translated by Noriyo Asano) O'Reilly Japan, Jan. 2007.
(Continued)

*Primary Examiner* — Reza Nabi

(57) ABSTRACT

The present invention provides an information display, an information display system, an information display method, a program, and a recording medium that allow information of a target item refined under a desired condition to be displayed easily.
The information display of the present invention includes: an information set display unit configured to display at least one item and information corresponding to each of the items; a condition display unit configured to display, in response to selection of the item, a menu showing at least one of refining conditions of the selected item; and a refining information set display unit configured to display, in response to selection of the refining condition, at least one refining item corresponding to the selected refining condition and refining information corresponding to each of the refining items with reference to the displayed items and
(Continued)

information corresponding to each of the items. The condition display unit and the refining information set display unit can be executed alternately. The condition display unit displays a refining condition, which has not been selected before n−1th (n is an integer of 2 or more) execution, in n-th and subsequent executions.

20 Claims, 11 Drawing Sheets

(51) Int. Cl.
    *G06F 3/0483*     (2013.01)
    *G06F 17/24*     (2006.01)
    *G06F 16/242*     (2019.01)
    *G06F 16/951*     (2019.01)

(52) U.S. Cl.
    CPC ........ *G06F 16/2425* (2019.01); *G06F 17/245* (2013.01); *G06Q 10/10* (2013.01); *G06F 16/951* (2019.01)

(58) Field of Classification Search
    USPC .......................................................... 715/841
    See application file for complete search history.

(56) References Cited

U.S. PATENT DOCUMENTS

| | | | | |
|---|---|---|---|---|
| 7,941,438 | B2* | 5/2011 | Molina-Moreno | G06F 8/35 707/756 |
| 2001/0003455 | A1* | 6/2001 | Grobler | G06F 16/2428 345/418 |
| 2003/0214538 | A1* | 11/2003 | Farrington | G06F 16/904 715/854 |
| 2005/0076312 | A1* | 4/2005 | Gardner | G06F 3/0482 715/853 |
| 2005/0289109 | A1* | 12/2005 | Arrouye | G06F 16/248 |
| 2007/0118651 | A1* | 5/2007 | Giampaolo | G06F 16/168 709/225 |
| 2007/0239771 | A1* | 10/2007 | Shimizu | G06F 16/44 |
| 2008/0163125 | A1* | 7/2008 | Gu | G06Q 10/0637 715/853 |
| 2008/0306954 | A1* | 12/2008 | Hornqvist | G06F 21/6218 |
| 2009/0183108 | A1* | 7/2009 | Arrouye | G06F 16/11 715/781 |
| 2010/0030734 | A1* | 2/2010 | Chunilal | G06Q 10/00 707/770 |
| 2011/0029925 | A1* | 2/2011 | Robert | G06F 3/04817 715/830 |
| 2011/0286588 | A1* | 11/2011 | Kim | H04M 1/2535 379/91.01 |
| 2014/0068295 | A1* | 3/2014 | Arrouye | G06F 1/329 713/320 |
| 2014/0129457 | A1* | 5/2014 | Peeler | G06Q 10/067 705/317 |
| 2014/0173499 | A1* | 6/2014 | Wicks | G06F 3/0605 715/781 |
| 2014/0222785 | A1* | 8/2014 | Arrouye | G06F 16/248 707/722 |
| 2016/0124923 | A1* | 5/2016 | Lim | G06F 3/0482 715/760 |
| 2016/0364770 | A1* | 12/2016 | Denton | G06Q 30/0277 |
| 2016/0364772 | A1* | 12/2016 | Denton | G06Q 30/0277 |
| 2017/0011418 | A1* | 1/2017 | Denton | G06F 3/0481 |
| 2017/0102866 | A1* | 4/2017 | Calvillo | G06F 3/04847 |
| 2017/0262165 | A9* | 9/2017 | Calvillo | G06F 3/0481 |
| 2018/0300023 | A1* | 10/2018 | Hein | G06Q 10/06 |
| 2019/0102425 | A1* | 4/2019 | Obeidat | G06F 16/2428 |

OTHER PUBLICATIONS

International Search Report for PCT Application No. PCT/JP2015/083395, dated Mar. 1, 2016.
Jenifer Tidwell, "Designing Interfaces: Patterns for Effective Interaction Design", (translation-supervised by Sociomedia, Inc., translated by Noriyo Asano) O'Railly Japan, Inc., Japan, Jan. 28, 2011.
Anonymous: "Quince UX Pattern: Tree-Table", Jul. 27, 2013, XP055516678, Retrieved from the Internet: URL:https://web.archive.org/web/20130727220413/http://quince.infragistics,com:80/Patterns/Tree-Table.aspx [retrieved on Oct. 18, 2018], Total 5 pages.
Communication dated Oct. 26, 2018 from the European Patent Office in counterpart Application No. 15887759.7.

\* cited by examiner (a)

| Item | ▷ Item A | ▷ Item B | ▷ Item C |
|---|---|---|---|
| ▷ Item 1 | Information 1A | ・・・・・ | ・・・・・ |
| ▷ Item 2 | ・・・・・ | ・・・・・ | ・・・・・ |
| ▷ Item 3 | ・・・・・ | ・・・・・ | ・・・・・ |

110

(b)

| Item | ▷ Item A | ▷ Item B | ▷ Item C |
|---|---|---|---|
| ▷ Item 1 | Information 1A | ・・・・・ | ・・・・・ |
| ▷ Item 2 | ・・・・・ | ・・・・・ | ・・・・・ |
| ● Item 3 | ・・・・・ | ・・・・・ | ・・・・・ |

110

- Condition 1
- Condition 2
- Condition 3

120A (c)

| Item | ▷ Item A | ▷ Item B | ▷ Item C |
|---|---|---|---|
| ▷ Item 1 | Information 1A | ・・・・・ | ・・・・・ |
| ▷ Item 2 | ・・・・・ | ・・・・・ | ・・・・・ |
| ◣ Item 3 | ・・・・・ | ・・・・・ | ・・・・・ |
| ▷ Item 31 | Information 31A | ・・・・・ | ・・・・・ |
| ▷ Item 32 | ・・・・・ | ・・・・・ | ・・・・・ |
| ▷ Item 33 | ・・・・・ | ・・・・・ | ・・・・・ |

110
130

(d)

| Item | ▷ Item A | ▷ Item B | ▷ Item C |
|---|---|---|---|
| ▷ Item 1 | Information 1A | ・・・・・ | ・・・・・ |
| ▷ Item 2 | ・・・・・ | ・・・・・ | ・・・・・ |
| ◣ Item 3 | ・・・・・ | ・・・・・ | ・・・・・ |
| ▷ Item 31 | Information 31A | ・・・・・ | ・・・・・ |
| ▷ Item 32 | ・・・・・ | ・・・・・ | ・・・・・ |
| ● Item 33 | ・・・・・ | ・・・・・ | ・・・・・ |

110
130

- Condition 1
- Condition 2
- ~~Condition 3~~

120B (e)

| Item | ▷ Item A | ▷ Item B | ▷ Item C |
|---|---|---|---|
| ▷ Item 1 | Information 1A | ・・・・・ | ・・・・・ |
| ▷ Item 2 | ・・・・・ | ・・・・・ | ・・・・・ |
| ◣ Item 3 | ・・・・・ | ・・・・・ | ・・・・・ |
| ▷ Item 31 | Information 31A | ・・・・・ | ・・・・・ |
| ▷ Item 32 | ・・・・・ | ・・・・・ | ・・・・・ |
| ◣ Item 33 | ・・・・・ | ・・・・・ | ・・・・・ |
| ▷ Item 21 | Information 21A | ・・・・・ | ・・・・・ |
| ▷ Item 22 | ・・・・・ | ・・・・・ | ・・・・・ |
| ▷ Item 23 | ・・・・・ | ・・・・・ | ・・・・・ |

| Item | ▷ Item A | ▷ Item B | ▷ Item C | |
|---|---|---|---|---|
| ▷ Item 1 | Information 1A | ・・・・・ | ・・・・・ | ⎫ |
| ▷ Item 2 | ・・・・・ | ・・・・・ | ・・・・・ | ⎬ 110 |
| ◢ Item 3 | ・・・・・ | ・・・・・ | ・・・・・ | ⎭ |
| ▷ Item 31 | Information 31A | ・・・・・ | ・・・・・ | ⎫ |
| ▷ Item 32 | ・・・・・ | ・・・・・ | ・・・・・ | ⎬ 130 |
| ● Item 33 | ・・・・・ | ・・・・・ | ・・・・・ | ⎭ |

- Condition 1
- Condition 2
- Condition 3

Non-display
・Hide this row

220A (b)

| Item | ▷ Item A | ▷ Item B | ▷ Item C | |
|---|---|---|---|---|
| ▷ Item 1 | Information 1A | ・・・・・ | ・・・・・ | ⎫ |
| ▷ Item 2 | ・・・・・ | ・・・・・ | ・・・・・ | ⎬ 110 |
| ◢ Item 3 | ・・・・・ | ・・・・・ | ・・・・・ | ⎭ |

(c)

| Item | ▷ Item A | ▷ Item B | ▷ Item C | |
|---|---|---|---|---|
| ▷ Item 1 | Information 1A | ・・・・・ | ・・・・・ | ⎫ |
| ▷ Item 2 | ・・・・・ | ・・・・・ | ・・・・・ | ⎬ 110 |
| ◢ Item 3 | ・・・・・ | ・・・・・ | ・・・・・ | ⎭ |

Redisplay
・Redisplay this row

220B (d)

| Item | ▷ Item A | ▷ Item B | ▷ Item C | |
|---|---|---|---|---|
| ▷ Item 1 | Information 1A | ・・・・・ | ・・・・・ | ⎫ |
| ▷ Item 2 | ・・・・・ | ・・・・・ | ・・・・・ | ⎬ 110 |
| ◢ Item 3 | ・・・・・ | ・・・・・ | ・・・・・ | ⎭ |
| ▷ Item 31 | Information 31A | ・・・・・ | ・・・・・ | ⎫ |
| ▷ Item 32 | ・・・・・ | ・・・・・ | ・・・・・ | ⎬ 130 |
| ● Item 33 | ・・・・・ | ・・・・・ | ・・・・・ | ⎭ |

| Item | ▷ Item A | ▷ Item B | ▷ Item C | |
|---|---|---|---|---|
| ▷ Item 1 | Information 1A | . . . . . | . . . . . | ⎫ |
| ▷ Item 2 | . . . . . | . . . . . | . . . . . | ⎬ 110 |
| ◢ Item 3 | . . . . . | . . . . . | . . . . . | ⎭ |
| ▷ Item 31 | Information 31A | . . . . . | . . . . . | ⎫ |
| ▷ Item 32 | . . . . . | . . . . . | . . . . . | ⎬ 130 |
| ◢ Item 33 | . . . . . | . . . . . | . . . . . | ⎭ |
| ▷ Item 21 | Information 21A | . . . . . | . . . . . | ⎫ |
| ▷ Item 22 | . . . . . | . . . . . | . . . . . | ⎬ 150 |
| ▷ Item 23 | . . . . . | . . . . . | . . . . . | ⎭ |

- Condition 1
- Condition 2
- Condition 3

Replacement
- Replace highest row with this row

420

(b)

| Item | ▷ Item A | ▷ Item B | ▷ Item C | |
|---|---|---|---|---|
| ◢ Item33 | . . . . . | . . . . . | . . . . . | ⎫ |
| ▷ Item 21 Information 21A | . . . . . | . . . . . | | ⎬ 450 |
| ▷ Item 22 | . . . . . | . . . . . | . . . . . | |
| ▷ Item 23 | . . . . . | . . . . . | . . . . . | ⎭ |

(c)

| Item | ▷ Item A | ▷ Item B | ▷ Item C | |
|---|---|---|---|---|
| ▷ Item 33 | . . . . . | . . . . . | . . . . . | ⎫ |
| ▷ Item 21 | Information 21A | . . . . . | . . . . . | ⎬ 450 |
| ▷ Item 22 | . . . . . | . . . . . | . . . . . | |
| ▷ Item 23 | . . . . . | . . . . . | . . . . . | ⎭ |

FIG. 4

INFORMATION DISPLAY, INFORMATION DISPLAY METHOD, INFORMATION DISPLAY SYSTEM, PROGRAM, AND RECORDING MEDIUM

This application is a National Stage Entry of PCT/JP2015/083395 filed on Nov. 27, 2015, which claims priority from Japanese Patent Application 2015-071821 filed on Mar. 31, 2015, the contents of all of which are incorporated herein by reference, in their entirety.

TECHNICAL FIELD

The present invention relates to an information display, an information display method, an information display system, a program, and a recording medium.

BACKGROUND ART

TreeGrid is known for a method of displaying information corresponding to each of multiple items, for example. In the TreeGrid, item information is hierarchically organized. In response to selection of an item displayed on a display image, an item belonging to the next hierarchy below the hierarchy of the selected item and information corresponding thereto are acquired and displayed on the display image (Non-Patent Document 1).

CITATION LIST

Non-Patent Document(s)

Non-Patent Document 1: Jenifer Tidwell, "Designing Interfaces: Patterns for Effective Interaction Design" (translation-supervised by Sociomedia, Inc., translated by Noriyo Asano), O'Reilly Japan, January 2007, p. 197

DISCLOSURE OF THE INVENTION

Problem to be Solved by the Invention

The TreeGrid only displays, with reference to the selected item, the item belonging to the next hierarchy below the hierarchy of the selected item and information corresponding thereto as described above. Thus, there is a problem that information corresponding to the item can be seen only in a stepwise manner along the hierarchy. For example, displaying the item information of the gross sales by the TreeGrid has a following problem. That is, in the case where the refining conditions such as sales by product, sales by year, and sales by area are displayed as the next hierarchy below the hierarchy of the product sales which is the highest item, after selection of the sales by year, display is limited to the refining conditions for refining the period, such as sales by month and sales by week.

Hence, the present invention is intended to provide an information display, an information display method, an information display system, a program, and a recording medium that allow information refined under a user's desired condition to be displayed easily.

Means for Solving Problem

In order to achieve the above object, the present invention provides an information display including: an information set display unit configured to display at least one item and information corresponding to each of the items; a condition display unit configured to display, in response to selection of the item, a menu showing at least one of refining conditions of the selected item; and a refining information set display unit configured to display, in response to selection of the refining condition, at least one refining item corresponding to the selected refining condition and refining information corresponding to each of the refining items with reference to the displayed items and information corresponding to each of the items, wherein the condition display unit and the refining information set display unit can be executed alternately, and the condition display unit displays a refining condition, which has not been selected before n–1th (n is an integer of 2 or more) execution, in n-th and subsequent executions.

The present invention also provides an information display method, including steps of: displaying at least one item and information corresponding to each of the items; displaying, in response to selection of the item, a menu showing at least one of refining conditions of the selected item; and displaying, in response to selection of the refining condition, at least one refining item corresponding to the selected refining condition and refining information corresponding to each of the refining items with reference to the displayed items and information corresponding to each of the items, wherein the condition display step and the refining information set display step can be carried out alternately, and in the condition display step, a refining condition, which has not been selected before n–1th (n is an integer of 2 or more) execution is displayed in n-th and subsequent executions.

The present invention also provides an information display system including: a terminal; and a server, wherein the terminal and the server are connectable via a communication network outside the system, the terminal includes: an information set display unit configured to display at least one item and information corresponding to each of the items; a condition display unit configured to display, in response to selection of the item, a menu showing at least one of refining conditions of the selected item; and a refining information set display unit configured to display, in response to selection of the refining condition, at least one refining item corresponding to the selected refining condition and refining information corresponding to each of the refining items with reference to the displayed items and information corresponding to each of the items, wherein the condition display unit and the refining information set display unit can be executed alternately, the condition display unit displays a refining condition, which has not been selected before n–1th (n is an integer of 2 or more) execution, in n-th and subsequent executions, and the server includes: an information storage unit configured to store the items, the information corresponding to each of the items, the refining conditions, the refining items, and the refining information corresponding to each of the refining items.

The present invention also provides a program that can execute the method according to the present invention on a computer.

The present invention also provides a recording medium recorded with the program according to the present invention.

Effects of the Invention

The present invention allows information refined under a user's desired condition to be displayed easily.

BRIEF DESCRIPTION OF DRAWINGS

FIG. 2 shows explanatory views of the components of a display 2.

FIG. 3 shows explanatory views of the components of a display 2.

FIG. 4 shows explanatory views of the components of a display 2.

DESCRIPTION OF EXEMPLARY EMBODIMENT

Figure 1:
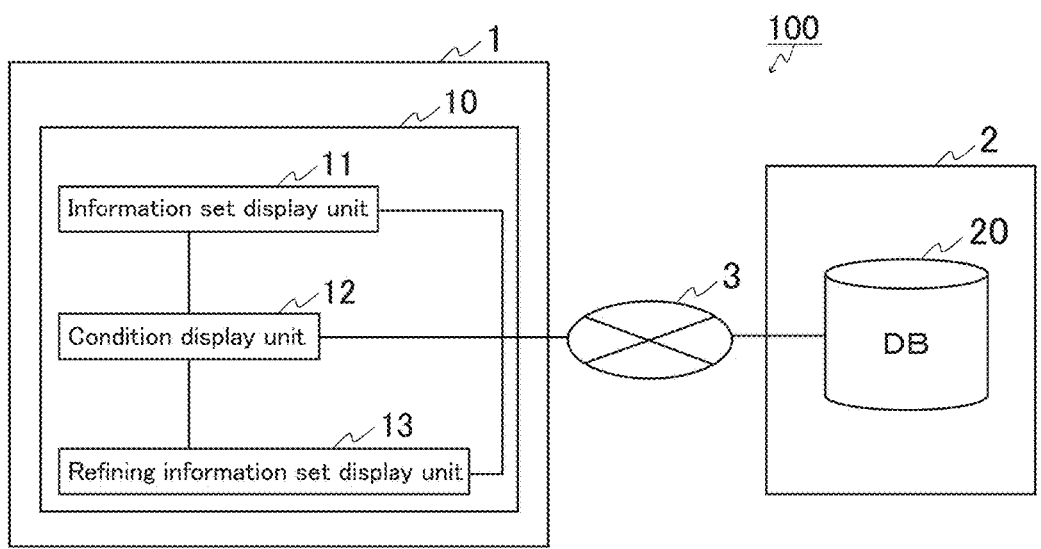
FIG. 1 is a block diagram showing an example of a display analysis system 100 of the present embodiment.

In the information display of the present invention, for example, the information set display unit and the refining information set display unit each display the items and information corresponding to each of the items in the form of at least one of a table and a graph.

The information display of the present invention further includes a condition non-display unit configured to display, in response to selection of any of the refining conditions displayed by the condition display unit, a menu of non-display of the selected refining condition, and hide, in response to selection of the non-display, the selected refining condition, for example.

The information display of the present invention further includes an information non-display unit configured to hide information corresponding to the refining condition selected as non-display by the condition non-display unit, for example.

The information display of the present invention further includes a condition redisplay unit configured to display, in response to selection of the item, a menu of redisplay of the hidden refining condition, and redisplay, in response to selection of the redisplay, the hidden refining condition, for example.

The information display of the present invention further includes an information redisplay unit configured to redisplay information corresponding to the refining condition selected as redisplay by the condition redisplay unit, for example.

The information display of the present invention further includes a display replacement unit configured to replace, in response to selection of any of the displayed items, the highest row with the selected item and information corresponding thereto as a highest information set, for example.

In the information display of the present invention, for example, the display replacement unit replaces the highest row with the highest information set and a refining information set of the highest information set as a highest information set group.

The information display of the present invention further includes a page display unit configured to display, in response to selection of any of the displayed items, a page showing the selected item and information corresponding thereto as a highest information set, for example.

In the information display of the present invention, for example, the page display unit displays the highest information set and a refining information set of the highest information set on the page.

The information display of the present invention further includes an analysis information display unit configured to display the refining information set of the selected item as analysis information in the form of a graph, for example.

In the information set display step and the refining information set display step of the information display method of the present invention, for example, the items and information corresponding to each of the items are displayed in the form of at least one of a table and a graph.

The information display method of the present invention further includes a step of displaying, in response to selection of any of the refining conditions displayed in the condition display step, a menu of non-display of the selected refining condition, and hiding, in response to selection of the non-display, the selected refining condition, for example.

The information display method of the present invention further includes a step of hiding information corresponding to the refining condition selected as non-display in the condition non-display step, for example.

The information display method of the present invention further includes a step of displaying, in response to selection of the item, a menu of redisplay of the hidden refining condition, and redisplaying, in response to selection of the redisplay, the hidden refining condition, for example.

The information display method of the present invention further includes a step of redisplaying information corresponding to the refining condition selected as redisplay in the condition redisplay step, for example.

The information display method of the present invention further includes a step of replacing, in response to selection of any of the displayed items, the highest row with the selected item and information corresponding thereto as a highest information set, for example.

In the display replacement step of the information display method of the present invention, for example, the highest row is replaced with the highest information set and a refining information set of the highest information set as a highest information set group.

The information display method of the present invention further includes a step of displaying, in response to selection of any of the displayed item data, a page showing the selected item data and information corresponding thereto as a highest information set, for example.

In the page display step of the information display method of the present invention, for example, the highest information set and a refining information set of the highest information set are displayed on the page.

The information display method of the present invention further includes a step of displaying the refining information set of the selected item as analysis information in the form of a graph, for example.

In the present invention, the item names and information corresponding thereto are not limited to particular names and information, and can be determined appropriately according to the field to which the display of the present invention is applied. The field of application is not limited to particular fields, and can be fields dealing with multiple items. Examples of the field include a business management field, a retail field, an education field, a medical field, and an administrative field.

In the case where the field of application is a business management field, the information can be, for example, information about performance management. Specific examples of the information include: contract information including clients, contract details, contract styles, and project names; account information including budget amounts, execution amounts, and sales costs; date information including contract dates and execution dates; personnel information including personnel numbers and personnel names; and progress information including progress prospects and progress performances.

In the case where the field of application is a retail field, the information can be, for example, information about merchandise management. Specific examples of the information include: purchase and sales information including purchase amounts, sales amounts, purchase quantities, sales quantities, stock quantities, suppliers, and customers; date information including purchase dates and sales dates; and personnel information including commodity managers and salespeople.

In the case where the field of application is an education field, the information can be, for example, information about teachers and students. Specific examples of the information include: name information including names of teachers, names of students, and names of parents; address information including addresses of teachers, addresses of students, and addresses of parents; and evaluation information including grades and evaluation comments.

In the case where the field of application is a medical field, the information can be, for example, information about patients. Specific examples of the information include: name information including names of doctors in charge and names of patients; account information including medical costs, drug costs, and inspection costs; date information including dates of visiting clinic, dates of returning to clinic, and dates of inspection; and history information including medical histories and dispensing histories.

In the case where the field of application is an administrative field, the information can be, for example, information about residents. Specific examples of the information include household information including family members, names, and addresses.

In the present invention, "to select" is, for example, to place a mouse pointer over a region showing a specific item or a specific refining condition on a display screen or to click the mouse pointer at that position.

The information display, the information display method, the information display system, the program, and the recording medium of the present invention are described below. The present invention however is not limited thereto. Identical parts are indicated with identical numerals and symbols in FIGS. 1 to 14 below. Regarding the descriptions of embodiments, reference can be made to one another, unless otherwise stated. Furthermore, the configurations of the embodiments can be combined, unless otherwise stated.

Embodiment 1

FIG. 1 is a block diagram showing an example of an information display system 100 of the present embodiment. The information display system 100 includes a terminal 1 and a server 2. The terminal 1 includes an information display 10 and the server 2 includes a database 20 serving as an information storage unit. The terminal 1 and the server 2 are connectable via a communication network 3. The communication network 3 is not limited to particular networks, and publicly known communication networks can be used. Specific examples of the network include Internet lines, telephone lines, and local area networks (LANs), and the network may be wired or wireless.

The database 20 stores the items, the information corresponding to each of the items, the refining conditions of the items, the refining items, and the refining information corresponding to each of the refining items, which are described below.

Next, the configuration of the information display 10 is described below. The information display 10 shown in FIG. 1 includes an information set display unit 11, a condition display unit 12, and a refining information set display unit 13 as essential components. Each of the components are described below with reference to explanatory views of (a) to (e) of FIG. 2.

The information set display unit 11 displays at least one item and information corresponding to each of the items. (a) of FIG. 2 shows an example of items and information corresponding to each of the items 110 displayed by the information set display unit 11. Hereinafter, the items and information corresponding to each of the items are together referred to as an "information set". As shown in (a) of FIG. 2, information set 110 is displayed in the form of a table. In the table, items 1 to 3 are displayed in a column and items A to C are displayed in a row. In a region in which one of the column items and one of the row items intersect, information corresponding to the column item and the row item is displayed. Specifically, in the case where the column item is item 1 and the row item is item A, information 1A corresponding to the item 1 and the item A is displayed.

The condition display unit 12 displays, in response to selection of the item, a menu showing at least one of the refining conditions of the selected item. (b) of FIG. 2 shows an example of a menu 120A displayed by the condition display unit 12. As shown in (b) of FIG. 2, when item 3 is selected, menu 120A is displayed below the item 3. The menu 120A shows conditions 1 to 3, which are the refining conditions.

The refining information set display unit 13 displays, in response to selection of the refining condition, at least one refining item corresponding to the selected refining condition and refining information corresponding to each of the refining items with reference to the displayed items and information corresponding to each of the items. (c) of FIG. 2 shows an example of the refining items and refining information corresponding to each of the refining items 130 displayed by the refining information set display unit 13. Hereinafter, the refining items and the refining information are together referred to as a "refining information set". As shown in (c) of FIG. 2, when the condition 3 is selected, items 31 to 33 are displayed in a column and information corresponding to each of the items A to C is displayed. For example, in the case where the column item is item 31 and the row item is item A, information 31A corresponding to the item 31 and the item A is displayed.

The information display 10 of the present embodiment can execute the condition display unit 12 and the refining information set display unit 13 alternately. The procedure from (a) to (c) of FIG. 2 shows a single execution of the condition display unit 12 and the refining information set display unit 13 of the information display 10 of the present embodiment. The repetition of the execution of the condition display unit 12 and the refining information set display unit 13 achieves further refining.

The condition display unit 12 displays a refining condition (s), which has not been selected before the n−1th (n is an integer of 2 or more) execution, in the n-th and subsequent executions. (d) of FIG. 2 shows an example of menu 120B displayed by the condition display unit 12. As shown in (d) of FIG. 2, item 33 is selected and menu 120B is displayed below the item 33. The menu 120B shows conditions 1 to 3 as in the menu 120A. The condition 3 which has already been selected is displayed in gray and set unselectable. Note that, it is possible to hide a refining condition(s) which has already been selected, for example.

The refining information set display unit 13 displays, in response to selection of the refining condition, at least one refining item corresponding to the selected refining condition and refining information corresponding to each of the refining items with reference to the displayed items and information corresponding to each of the items. (e) of FIG. 2 shows an example of refining information set 150. As shown in (e) of FIG. 2, when the condition 2 is selected, items 21 to 23 are displayed in a column, and information corresponding to each of the items A to C is displayed. For example, in the case where the column item is item 21 and the row item is item A, information 21A corresponding to the item 21 and the item A is displayed.

The information display 10 of the present embodiment may execute the condition display unit 12 and the refining information set display unit 13 alternately, for example, until the refining condition which has not been selected disappears. For example, in the case of the explanatory views of (a) to (e) of FIG. 2, the condition display unit 12 and the refining information set display unit 13 may be executed one more time for condition 1, which has not been selected.

While information sets and refining information sets are displayed in the form of a table in the explanatory views of (a) to (e) of FIG. 2, the information display of the present embodiment is not limited thereto. For example, the information sets and the refining information sets may be displayed in the form of a graph or in the form of both a table and a graph.

As described above, a common TreeGrid displays, in response to selection of the displayed specific item, only a lower-order item(s) of the selected item and information corresponding thereto.

In contrast, in the information display 10 of the present embodiment, a menu showing refining conditions is displayed by the condition display unit 12. In response to selection of a specific refining condition among the displayed refining conditions, the displayed items and information corresponding to each of the items are refined. The refining conditions can be set freely to meet the user's needs, for example. For example, a single selection of the item among the items displayed by the information set display unit 11 allows the item refined under a specific condition and information corresponding thereto to be displayed and further allows the item refined under another condition and information corresponding thereto to be displayed. In this manner, the information display 10 of the present embodiment allows information of a target item refined under a desired condition to be displayed easily.

In the present embodiment, the information display 10 further include a condition non-display unit. The condition non-display unit displays, in response to selection of any of the refining conditions displayed by the condition display unit 12, a menu of non-display of the selected refining condition, and hides, in response to selection of the non-display, the selected refining condition.

In the present embodiment, the information display 10 may further include an information non-display unit. The information non-display unit hides information corresponding to the refining condition selected as non-display by the condition non-display unit.

In the present embodiment, the information display 10 may further include a condition redisplay unit. The condition redisplay unit displays, in response to selection of the item, a menu of redisplay of the hidden refining condition, and redisplays, in response to selection of the redisplay, the hidden refining condition.

In the present embodiment, the information display 10 may further include an information redisplay unit. The information redisplay unit redisplays information corresponding to the refining condition selected as redisplay by the condition redisplay unit.

The condition non-display unit, the information non-display unit, the condition redisplay unit, and the information redisplay unit are described below with reference to the explanatory views of (a) to (d) of FIG. 3. As shown in (a) of FIG. 3, the condition non-display unit displays non-display menu "hide this row" 220A for hiding the selected refining condition (condition 3 in FIG. 3). In response to selection of the non-display, the selected refining condition is hidden. Specifically, for example, as shown in (b) of FIG. 3, the information non-display unit hides information corresponding to the refining condition (condition 3 in FIG. 3) selected as non-display. While all pieces of information corresponding to the refining condition 3 are hidden in (b) of FIG. 3, some pieces of information (for example, item 33 and information corresponding thereto) may be hidden.

Subsequently, as shown in (c) of FIG. 3, in response to selection of the item (item 33 in FIG. 3), menu 220B of redisplay of the hidden refining condition is displayed, and, in response to selection of the redisplay, the hidden refining condition is redisplayed. Specifically, for example, as shown in (d) of FIG. 3, the information redisplay unit redisplays information corresponding to the refining condition (condition 3 in FIG. 3) selected as redisplay by the condition redisplay unit. While all pieces of information corresponding to the refining condition 3 are redisplayed in (d) of FIG. 3, some pieces of information (for example, item 33 and information corresponding thereto) may be redisplayed.

The information display 10 of the present embodiment including the aforementioned units allows unnecessary items and information corresponding thereto to be hidden and hidden items and information corresponding thereto to be redisplayed as needed, for example. This makes it possible to find information of a target item easily and analyze the information of the target item easily, for example.

In the present embodiment, the information display 10 may further include a display replacement unit. The display replacement unit replaces, in response to selection of any of the displayed items, the highest row with the selected item and information corresponding thereto as a highest information set. Preferably, the display replacement unit replaces the highest row with the highest information set and a refining information set of the highest information set as a highest information set group.

The display replacement unit is described in detail below with reference to the explanatory views of (a) to (c) of FIG. 4. As shown in (a) of FIG. 4, the display replacement unit may display replacement menu "replace highest row with this row" 420 for selecting the item with which the highest row is replaced. In response to selection of item 33, as shown in (b) of FIG. 4, the highest row is replaced with the selected item 33 and information corresponding thereto as a highest information set 450. In this case, as shown in (c) of FIG. 4, the highest row may be replaced with the highest information set (item 33 and information corresponding thereto) and the refining information set of the highest information set (items 21 to 23 and information corresponding to each of the items) as a highest information set group 450, for example.

While the replacement menu is displayed together with a menu showing refining conditions as a single menu in the menu 420 in the explanatory view of (a) of FIG. 4, the display 1 of the present embodiment is not limited thereto and these menus may be displayed separately.

The information display 10 of the present embodiment including the display replacement unit allows information of a target item to be found easily and the information of the target item to be analyzed easily, for example.

In the present embodiment, the information display 10 may further include a page display unit. The page display unit displays, in response to selection of any of the displayed items, a page showing the selected item and information corresponding thereto as a highest information set. Preferably, the page display unit displays the highest information set and a refining information set of the highest information set on the page.

The page display unit is described in detail below with reference to the explanatory views of (a) to (b) of FIG. 5. As shown in (a) of FIG. 5, the page display unit may display navigation menu "navigate to page of this row" 520 for selecting the item for navigating to the page showing the item and information corresponding thereto as a highest information set. In response to selection of item 33, as shown in (b) of FIG. 5, the user is taken to page 550 showing the selected item 33 and information corresponding thereto as a highest information set. On page 550, for example, the item 33, items X and Y for refining the item 33, and information corresponding to each of the items are displayed in the form of a table and a graph.

Figure 5:
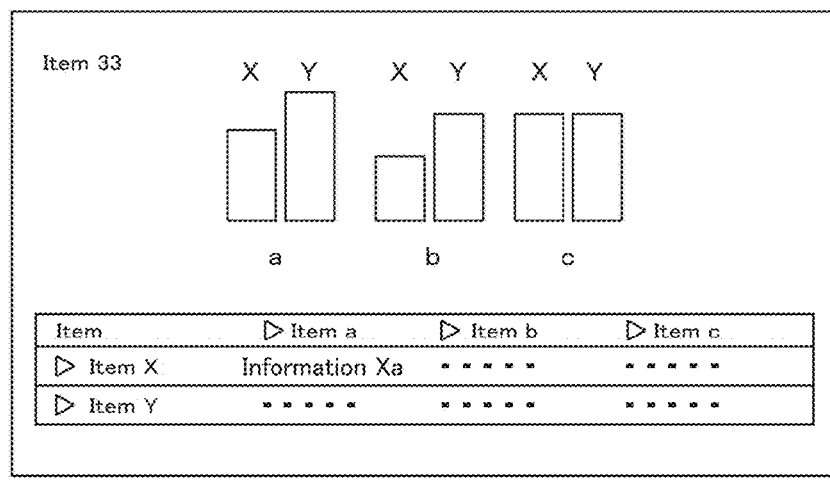
FIG. 5 shows explanatory views of the components of a display 2.

While the navigation menu is displayed together with a menu showing refining conditions as a single menu in the menu 520 in the explanatory view of (a) of FIG. 5, the display 1 of the present embodiment is not limited thereto and these menus may be displayed separately.

The information display 10 of the present embodiment including the page display unit allows information within a target item to be analyzed easily.

In the present embodiment, the information display 10 may further include an analysis information display unit. The analysis information display unit displays the refining information set of the selected item as analysis information in the form of a graph. The analysis here is not limited to particular analyses, and can be, for example, calculation of the average value of the selected item data.

The analysis information display unit is described in detail below with reference to the explanatory views of (a) and (b) of FIG. 6. As shown in (a) of FIG. 6, the analysis information display unit may display analysis menu "calculate average value of this row" 620 for selecting an item to be analyzed. In response to selection of item 33, as shown in (b) of FIG. 6, the analysis information display unit displays the refining information set corresponding to the selected item 33 as analysis information in the form of a graph.

Figure 6:
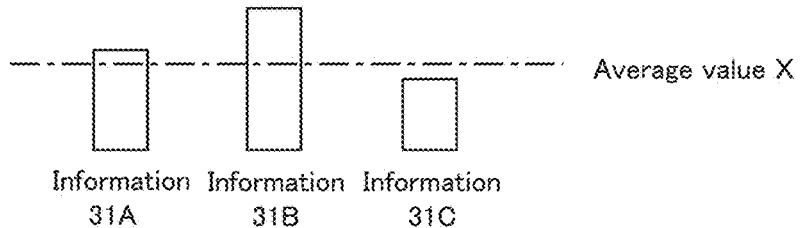
FIG. 6 shows explanatory views of the components of a display 2.

While the analysis menu is displayed together with a menu showing refining conditions as a single menu in the menu 620 in the explanatory view of (a) of FIG. 6, the display 1 of the present embodiment is not limited thereto and these menus may be displayed separately.

The information display 10 of the present embodiment including the analysis information display unit allows information of a necessary item to be analyzed promptly.

The information display 10 may include the analysis information display unit, or the analysis information display unit may be independent from the information display 10 as an analyzer. In this case, in the present embodiment, an information analysis system 100 includes the information display 10 and the analyzer (information analyzer).

Figure 7:
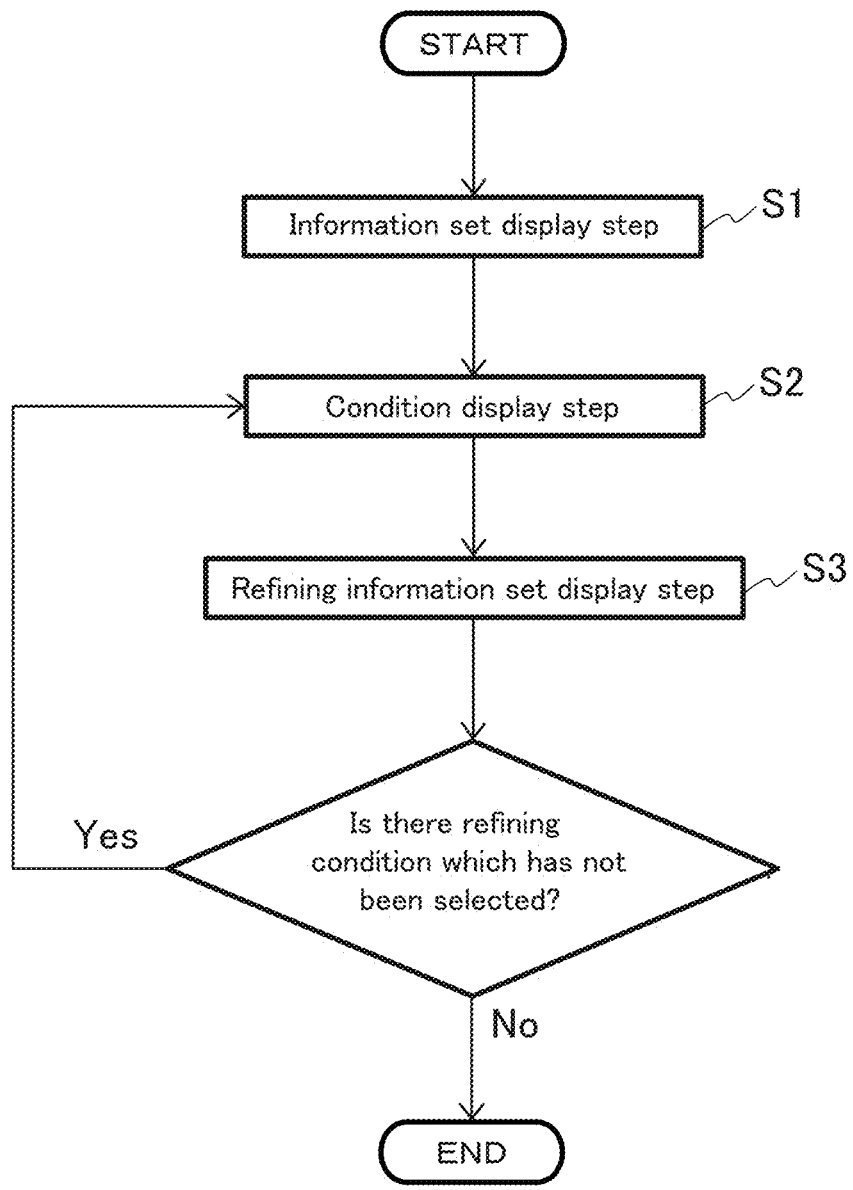
FIG. 7 is a flowchart showing an example of the display method of the present embodiment.

Next, the information display method of the present embodiment is described below with reference to the flowchart of FIG. 7.

The information display method of the present embodiment is performed as follows using the information display 10 of the present embodiment shown in FIG. 1, for example. The information display method of the present embodiment however is not limited to the use of the information display 10 of FIG. 1.

First, the information set display unit 11 displays at least one item and information corresponding to each of the items (information set display step, S1). Subsequently, in response to selection of the item, the condition display unit 12 displays a menu showing at least one of the refining conditions of the selected item (condition display step, S2). Subsequently, the refining information set display unit 13 displays, in response to selection of the refining condition, at least one refining item corresponding to the selected refining condition and refining information corresponding to each of the refining items with reference to the displayed items and information corresponding to each of the items (refining information set display step, S3). S2 and S3 can be carried out alternately. For example, if there is a refining condition(s) which has not been selected (YES), S2 and S3 are carried out alternately. In this case, a refining condition(s), which has not been selected before the n−1th (n is an integer of 2 or more) execution, is displayed in the n-th and subsequent executions in S2. If there is no refining condition which has not been selected (NO), the procedure of the information display method of the present embodiment ends.

In the present embodiment, for example, the items and information corresponding to each of the items are displayed in the form of at least one of a table and a graph in the information set display step and the refining information set display step.

In the information display method of the present embodiment, a menu showing refining conditions is displayed in the condition display step (S2). In response to selection of a specific refining condition among the displayed refining conditions, the items and information corresponding to each of the displayed items are refined. The refining conditions can be set freely to meet the user's needs, for example. For example, a single selection of the item among the items displayed in the information set display step (S1) allows the item refined under a specific condition and information corresponding thereto to be displayed and further allows the item refined under another condition and information corresponding thereto to be displayed. Thus, the information display method of the present embodiment allows information of a target item refined under a desired condition to be displayed easily.

The information display method of the present embodiment may further include a condition non-display step (S21). In S21, in response to selection of any of the refining conditions shown in the condition display step (S2), a menu of non-display of the selected refining condition is displayed, and, in response to selection of the non-display, the selected refining condition is hidden.

The information display method of the present embodiment may further include an information non-display step (S22). In S22, information corresponding to the refining condition selected as non-display in the condition non-display step (S21) is hidden.

The information display method of the present embodiment may further include a condition redisplay step (S23). In S23, in response to selection of the item, a menu of redisplay of the hidden refining condition is displayed, and, in response to selection of the redisplay, the hidden refining condition is redisplayed.

The information display method of the present embodiment may further include an information redisplay step (S24). In S24, information corresponding to the refining condition selected as redisplay in the condition redisplay step (S23) is redisplayed.

In the present embodiment, steps (S21 to S24) may be carried out after S2 or S3, for example.

The information display method of the present embodiment including steps (S21 to S24) allows unnecessary items and information corresponding thereto to be hidden and hidden items and information corresponding thereto to be redisplayed as needed, for example. This makes it possible to find information of a target item easily and analyze the information of the target item easily, for example.

The information display method of the present embodiment may further include a display replacement step (S31). In the display replacement step (S31), in response to selection of any of the displayed items, the highest row is replaced with the selected item and information corresponding thereto as a highest information set. In S31, preferably, the highest row is replaced with the highest information set and a refining information set of the highest information set as a highest information set group. The information display method of the present embodiment including the display replacement step (S31) allows information of a target item to be found easily and the information of the target item to be analyzed easily, for example. In the present embodiment, S31 may be carried out after S2 or S3, for example.

The information display method of the present embodiment may further include a page display step (S41). In S41, in response to selection of any of the displayed item data, the user is taken to a page showing the selected item data and information corresponding thereto as a highest information set. In S41, preferably, the highest information set and a refining information set of the highest information set are displayed on the page. The information display method of the present embodiment including S41 allows information within a target item to be analyzed easily. In the present embodiment, S41 may be carried out after S2 or S3, for example.

The information display method of the present embodiment may further include an analysis information display step (S51). In S51, the refining information set of the selected item is displayed as analysis information in the form of a graph. The information display method of the present embodiment including the analysis information display step (S51) allows information of a necessary item to be analyzed promptly. In the present embodiment, S51 may be carried out after S2 or S3, for example.

Specific examples of the case where the information display method of the present embodiment is applied to a display method of account information such as a budget amount or the like of a performance management system are described with reference to FIGS. 8 to 14.

Figure 8:
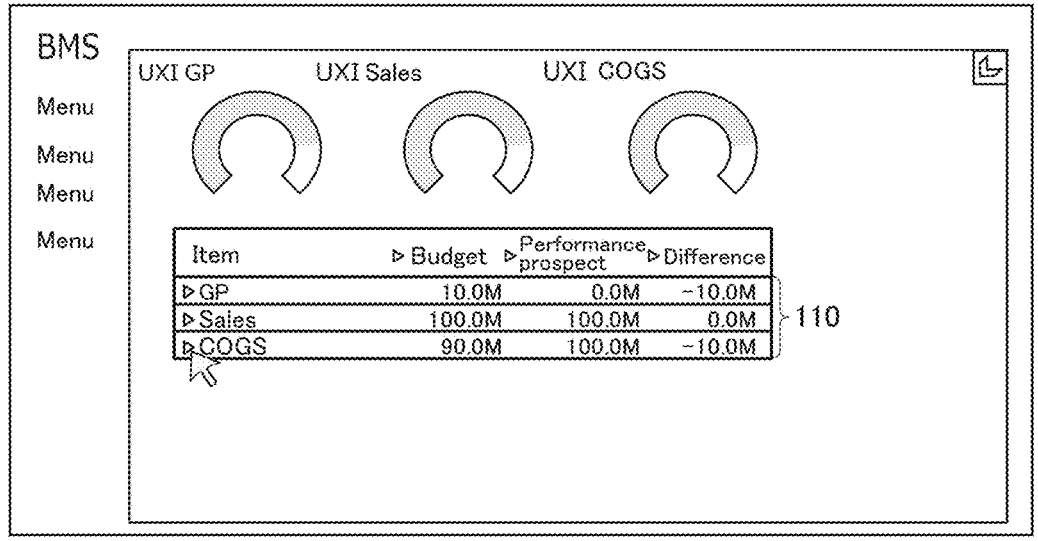
FIG. 8 is an explanatory view showing a part of a specific example of the display method of the present embodiment.

As shown in FIG. 8, information set 110 is displayed by the information set display unit 11. Items namely "gross profit (GP)", "sales", and "cost of goods sold (COGS)" are displayed in a column, items namely "budget", "performance prospect", and "difference" are described in a row, and an amount of money corresponding to each of the column items and each of the row item is displayed as information set 110 in a table.

Figure 9:
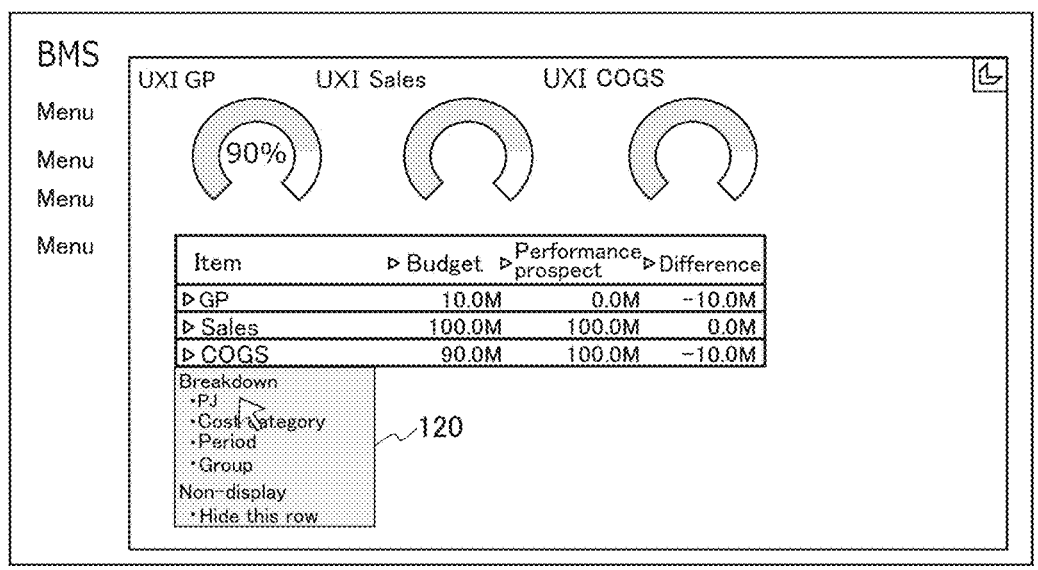
FIG. 9 is an explanatory view showing a part of a specific example of the display method of the present embodiment.

In response to selection of "COGS", as shown in FIG. 9, refining conditions for refining the COGS are displayed as menu 120 by the condition display unit 12. In response to selection of "COGS", for example, the data "90%" is displayed in the graph of GP above the table. As shown in FIG. 9, four refining conditions namely "project (PJ)", "cost category", "period", and "group" are displayed as refining conditions.

Figure 10:
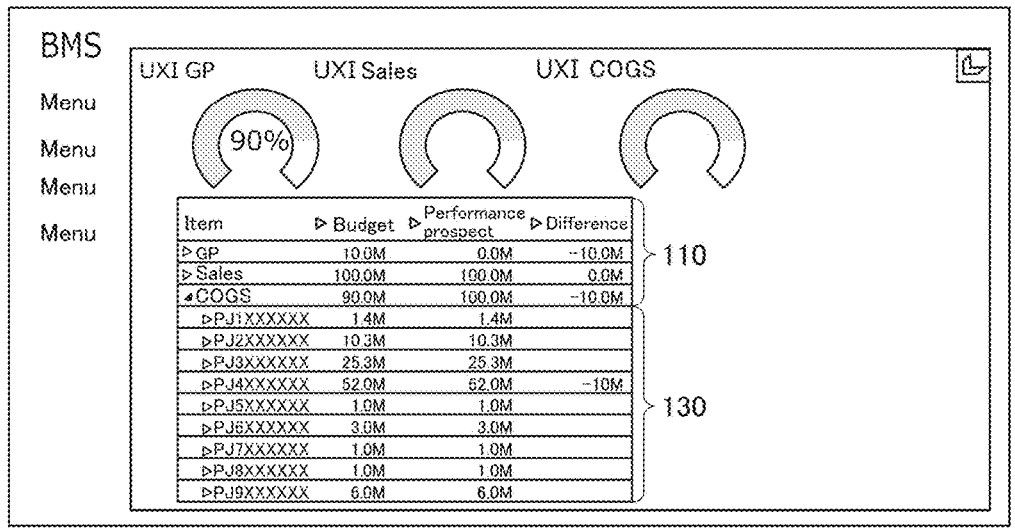
FIG. 10 is an explanatory view showing a part of a specific example of the display method of the present embodiment.

In response to selection of the refining condition "PJ", as shown in FIG. 10, refining information set 130 corresponding to the selected "PJs" of the COGS is displayed by the refining information set display unit 13. As shown in FIG. 10, the item names (PJ1 to PJ9) and refining information corresponding to each of them are displayed as the refining information set 130.

Figure 11:
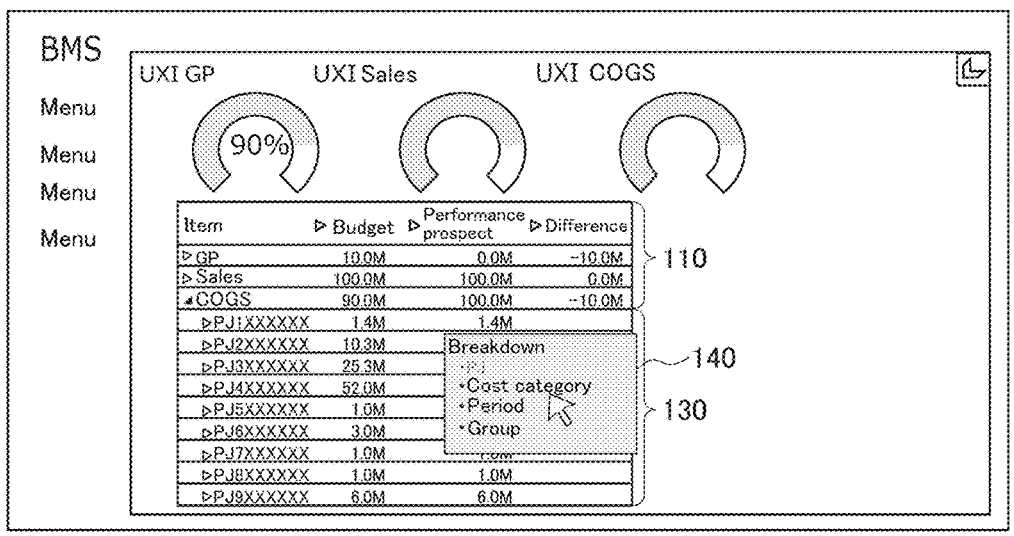
FIG. 11 is an explanatory view showing a part of a specific example of the display method of the present embodiment.

In response to selection of the item "PJ4" of the refining information set 130, as shown in FIG. 11, menu 140 is displayed by the condition display unit 12 so that refining conditions, which have not been selected in the first execution, among the refining conditions for refining the item PJ4 can be selected. As shown in FIG. 11, "cost category", "period", and "group" are displayed as the refining conditions.

Figure 12:
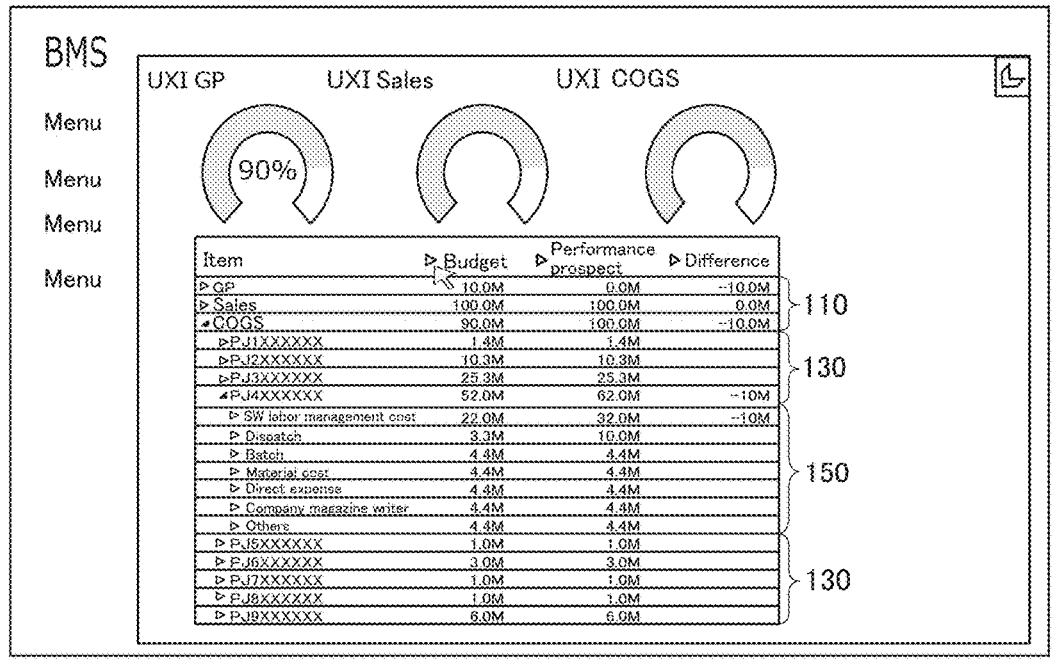
FIG. 12 is an explanatory view showing a part of a specific example of the display method of the present embodiment.

In response to selection of the refining condition "cost category", as shown in FIG. 12, refining information set 150 corresponding to the selected cost categories of PJ4 are displayed by the refining information set display unit 13. As shown in FIG. 12, items of the refining information set 150 namely "SW labor management cost", "dispatch", "batch", "material cost", "direct expense", "company magazine writer", and "others", and information corresponding to each of the items are displayed.

Figure 13:
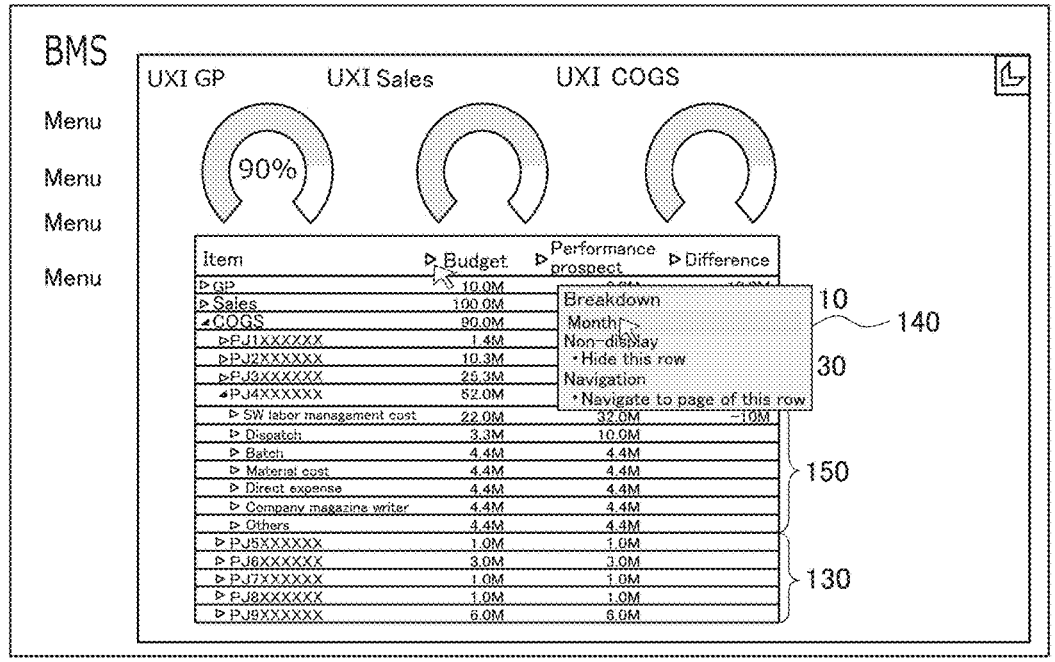
FIG. 13 is an explanatory view showing a part of a specific example of the display method of the present embodiment.

In response to selection of the item "budget" of the information set 110, as shown in FIG. 13, the refining conditions for refining the budget are displayed in menu 140 by the condition display unit 11. As shown in FIG. 13, "month" is displayed as the refining condition.

Figure 14:
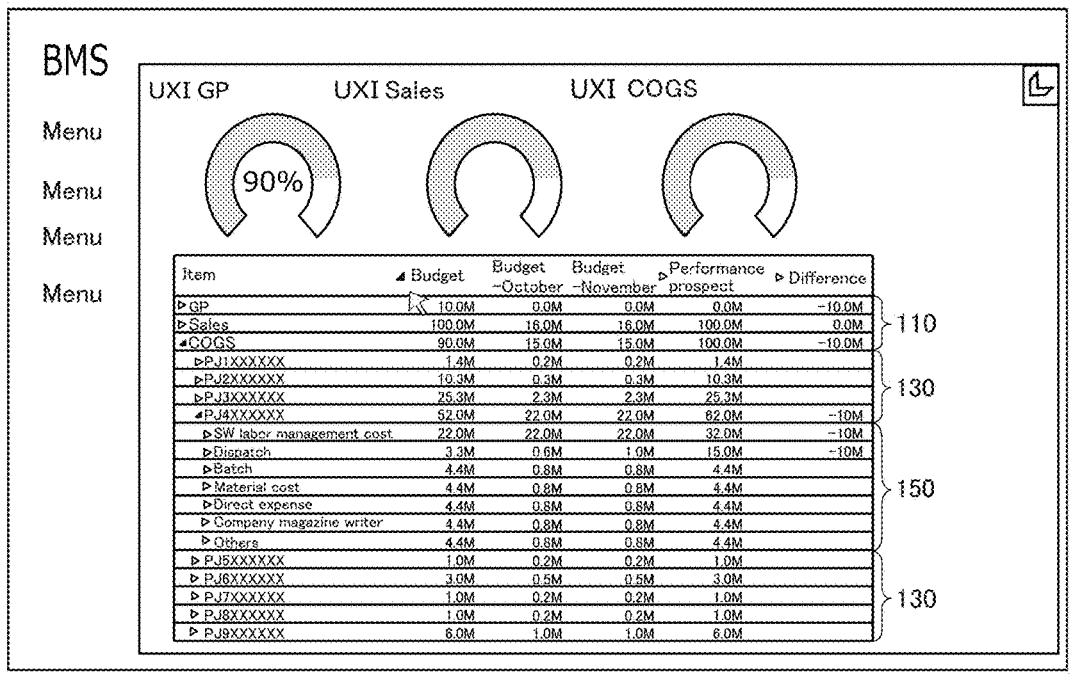
FIG. 14 is an explanatory view showing a part of a specific example of the display method of the present embodiment.

In response to selection of the refining condition "month", as shown in FIG. 14, a refining information set corresponding to the budget by month is displayed by the refining information set display unit 13. As shown in FIG. 14, the item names (budget-October and budget-November) and information corresponding to each of them are displayed as the refining information set.

As described above, the information display and the information analysis method of the present embodiment can be suitably applied to a display or a display method of account information such as a budget amount or the like of a performance management system. The information display and the information display method of the present embodiment however are not limited to account information of a performance management system, and can be suitably applied to a display and a display method of various pieces of information related to the performance management. The information display and the information display method of the present embodiment are not limited to a performance management system, and can be suitably applied to a retail field, an education field, a medical field, an administrative field, and the like.

When the field of application is a retail field, the information display and the information display method of the present embodiment can be suitably applied to a display and a display method of each information related to a merchandise management system. As an example, when the information is a sales quantity, for example, the item to be displayed by the information set display unit 11 can be "all stores" and the refining conditions to be displayed by the refining information set display unit 13 can be "area", "number of staffs", and the like. Application of the information display and the information display method of the present embodiment allows, for example, not only the information on an area where a sales quantity is great but also the information on the most effective number of staffs in sales quantity in a specific area to be given, thereby achieving a diversity of analyses.

When the field of application is an education field, the information display and the information display method of the present embodiment can be suitably applied to a display and a display method of each information in an information management system regarding teachers and students. As an example, when the information is a grade, for example, the item to be displayed by the information set display unit 11 can be "all students" and the refining conditions to be displayed by the refining information set display unit 13 can be "class", "gender", and the like. Application of the information display and the information display method of the present embodiment allows, for example, not only the information on a class which gets the highest grade but also the information which of male or female gets a higher grade in a specific class to be given, thereby achieving a diversity of analyses.

When the field of application is a medical field, the information display and the information display method of the present embodiment can be suitably applied to a display and a display method of each information in an information management system regarding patients. As an example, when the information is a medical cost, for example, the item to be displayed by the information set display unit 11 can be "sum of medical cost" and the refining conditions to be displayed by the refining information set display unit 13 can be "disease", "age", and the like. Application of the information display and the information display method of the present embodiment allows, for example, not only the information on a patient who is charged the highest medical cost but also the information on an age bracket which is charged the highest medical cost among patients of specific disease to be given, thereby achieving a diversity of analyses.

When the field of application is an administrative field, the information display and the information display method of the present embodiment can be suitably applied to a display and a display method of each information in an information management system regarding residents. As an example, when the information is the number of households, for example, the item to be displayed by the information set display unit 11 can be "total number of households" and the refining conditions to be displayed by the refining information set display unit 13 can be "area", "married/unmarried", and the like. Application of the information display and the information display method of the present embodiment allows, for example, not only the information on an area having the largest number of households but also the information on the number of married ones and the number of unmarried ones in a specific area to be given, thereby achieving a diversity of analyses.

The program of the present embodiment is a program that can execute the display method or the display analysis method on a computer. The program of the present embodiment may be recorded in a computer-readable storage medium, for example. The recording medium is not limited to particular media, and examples thereof include random access memories (RAMs), read-only memories (ROMs), hard disks (HDs), optical disks, and Floppy® disks (FDs).

The invention of the present application was described above with reference to the embodiments. However, the invention of the present application is not limited to the above-described embodiments. Various changes that can be understood by those skilled in the art can be made in the configurations and details of the invention of the present application within the scope of the invention of the present application.

This application is based upon and claims the benefit of priority from Japanese patent application No. 2015-071821, filed on Mar. 31, 2015, the disclosure of which is incorporated herein its entirety by reference.

INDUSTRIAL APPLICABILITY

Application of the display, the display analyzer, the display system, the display analysis system, the display method, and the display analysis method of the present embodiment is not limited to particular applications, and can be suitably applied to a business management field, a retail field, an education field, a medical field, an administrative field, and the like.

EXPLANATION OF REFERENCE NUMERALS

1 information display
2 server
3 communication network
11 information set display unit
12 condition display unit
13 refining information set display unit
100 information display system

What is claimed is:
1. An information display comprising:
a memory configured to store one or more instructions; and
at least one processor configured to execute the one or more instructions to:
  display at least one item and information corresponding to each of the items;
  display, in response to selection of the item, a menu showing at least one of refining conditions of the selected item;
  display, in response to selection of the refining condition, at least one refining item corresponding to the selected refining condition and refining information corresponding to each of the refining items with reference to the displayed items and information corresponding to each of the items;
  repeatedly display the refining condition and display the refining information set for a plurality of executions; and
  display a refining condition, which has not been selected before n−1th (n is an integer of 2 or more) execution, among the plurality of executions, in n-th and subsequent executions.

2. The information display according to claim 1, wherein the processor is configured to display the items and information corresponding to each of the items in the form of at least one of a table and a graph.

3. The information display according to claim 1, wherein the processor is further configured to display, in response to selection of any of the refining conditions displayed by the condition display unit, a menu of non-display of the selected refining condition, and hide, in response to selection of the non-display, the selected refining condition.

4. The information display according to claim 3, wherein the processor is further configured to hide information corresponding to the refining condition selected as non-display by the condition non-display unit.

5. The information display according to claim 3, wherein the processor is further configured to display, in response to selection of the item, a menu of redisplay of the hidden refining condition, and redisplay, in response to selection of the redisplay, the hidden refining condition.

6. The information display according to claim 5, wherein the processor is further configured to redisplay information corresponding to the refining condition selected as redisplay by the condition redisplay unit.

7. The information display according to claim 1, wherein the processor is further configured to replace, in response to selection of any of the displayed items, the highest row with the selected item and information corresponding thereto as a highest information set.

8. The information display according to claim 7, wherein the processor is configured to replace the highest row with the highest information set and a refining information set of the highest information set as a highest information set group.

9. The information display according to claim 1, wherein the processor is further configured to display, in response to selection of any of the displayed items, a page showing the selected item and information corresponding thereto as a highest information set.

10. The information display according to claim 9, wherein the processor is configured to display the highest information set and a refining information set of the highest information set on the page.

11. The information display according to claim 1, wherein the processor is further configured to display the refining information set of the selected item as analysis information in the form of a graph.

12. An information display method, comprising:
displaying at least one item and information corresponding to each of the items;
displaying, in response to selection of the item, a menu showing at least one of refining conditions of the selected item;
displaying, in response to selection of the refining condition, at least one refining item corresponding to the selected refining condition and refining information corresponding to each of the refining items with reference to the displayed items and information corresponding to each of the items;
repeatedly displaying the refining condition and displaying the refining information set for a plurality of executions; and
displaying, in n-th (n is an integer of 2 or more) and subsequent executions, among the plurality of executions, a refining condition which has not been selected before n−1th execution.

13. The method according to claim 12, wherein the items and information corresponding to each of the items are displayed in the form of at least one of a table and a graph.

14. The method according to claim 12, further comprising:
displaying, in response to selection of any of the refining conditions, a menu of non-display of the selected refining condition, and hiding, in response to selection of the non-display, the selected refining condition.

15. The method according to claim 14, further comprising:
hiding information corresponding to the refining condition selected as non-display.

16. The method according to claim 14, further comprising:
displaying, in response to selection of the item, a menu of redisplay of the hidden refining condition, and redisplaying, in response to selection of the redisplay, the hidden refining condition.

17. The method according to claim 16, further comprising:
redisplaying information corresponding to the refining condition selected as redisplay.

18. The method according to claim 12, further comprising:
replacing, in response to selection of any of the displayed items, the highest row with the selected item and information corresponding thereto as a highest information set.

19. An information display system comprising:
a terminal; and
a server, wherein
the terminal and the server are connectable via a communication network outside the system,
the terminal comprises at least one processor configured to:
display at least one item and information corresponding to each of the items;
display, in response to selection of the item, a menu showing at least one of refining conditions of the selected item;
display, in response to selection of the refining condition, at least one refining item corresponding to the selected refining condition and refining information corresponding to each of the refining items with reference to the displayed items and information corresponding to each of the items;
repeatedly display the refining condition and display the refining information set for a plurality of executions; and
display a refining condition, which has not been selected before n−1th (n is an integer of 2 or more) execution, in n-th and subsequent executions, among the plurality of executions, and
the server comprises:
an information storage unit, configured to store the items, the information corresponding to each of the items, the refining conditions, the refining items, and the refining information corresponding to each of the refining items.

20. A non-transitory computer-readable recording medium recorded with a program that can execute the method according to claim 12.

* * * * *